United States Patent
Deatrick et al.

(10) Patent No.: US 11,153,243 B1
(45) Date of Patent: Oct. 19, 2021

(54) SYSTEMS AND METHODS FOR FILTERING CONTENT PROVIDED VIA TEXT MESSAGES

(71) Applicant: Verizon Patent and Licensing Inc., Basking Ridge, NJ (US)

(72) Inventors: Matthew Scott Deatrick, Oak Ridge, NJ (US); Alexander Hagans, Berwyn Heights, MD (US); Felix Montanez, Bayonne, NJ (US); Andrew Wahlon Lam, River Edge, NJ (US); Rezwanul Azim, Pleasant Hill, CA (US); Nilesh Shah, Monmouth Junction, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 17/248,478

(22) Filed: Jan. 26, 2021

(51) Int. Cl.
 *H04L 12/58* (2006.01)
 *G06N 20/00* (2019.01)

(52) U.S. Cl.
 CPC .............. *H04L 51/12* (2013.01); *G06N 20/00* (2019.01); *H04L 51/04* (2013.01); *H04L 51/10* (2013.01); *H04L 51/14* (2013.01)

(58) Field of Classification Search
 CPC ........ G06N 20/00; G06N 20/10; H04L 51/10; H04L 51/18; H04L 51/12; H04L 51/04; H04L 51/14; G06F 40/134; G06Q 50/01
 See application file for complete search history.

(56) References Cited

U.S. PATENT DOCUMENTS

| | | | |
|---|---|---|---|
| 8,023,974 B1* | 9/2011 | Diao | G06K 9/6269 455/466 |
| 10,028,204 B2* | 7/2018 | Blankenship | H04L 67/303 |
| 10,057,184 B1* | 8/2018 | Prahlad | H04L 41/0873 |
| 10,536,487 B2* | 1/2020 | Gonzalez De Langarica | H04L 65/1006 |
| 2007/0100960 A1* | 5/2007 | Eichstaedt | H04L 67/26 709/217 |
| 2011/0153759 A1* | 6/2011 | Rathod | G06F 3/0482 709/206 |
| 2011/0292174 A1* | 12/2011 | Suh | H04N 13/194 348/43 |
| 2014/0365476 A1* | 12/2014 | Rajakarunanayake | G06F 16/958 707/724 |
| 2014/0372557 A1* | 12/2014 | Buckley | H04L 65/1006 709/217 |
| 2015/0033143 A1* | 1/2015 | Lee | H04L 51/16 715/752 |
| 2016/0344776 A1* | 11/2016 | Gonzalez De Langarica | H04L 65/1073 |

(Continued)

*Primary Examiner* — Sargon N Nano

(57) ABSTRACT

A rich communication services (RCS) system may receive a message associated with content. The message may be transmitted by a first user device and destined for a second user device and associated with content. The RCS system may receive subscription data associated with a user of the first user device and including information indicating whether content filtering is enabled for the user. The RCS system may determine whether content filtering is enabled for the user based on the subscription data, and may process the content, when the content filtering is enabled for the user and with a machine learning model, to determine whether to filter the content. The RCS system may perform one or more actions based on whether the content is to be filtered.

20 Claims, 10 Drawing Sheets

(56) References Cited

U.S. PATENT DOCUMENTS

2020/0250143 A1\* 8/2020 Ball ........................ G06F 16/21

\* cited by examiner

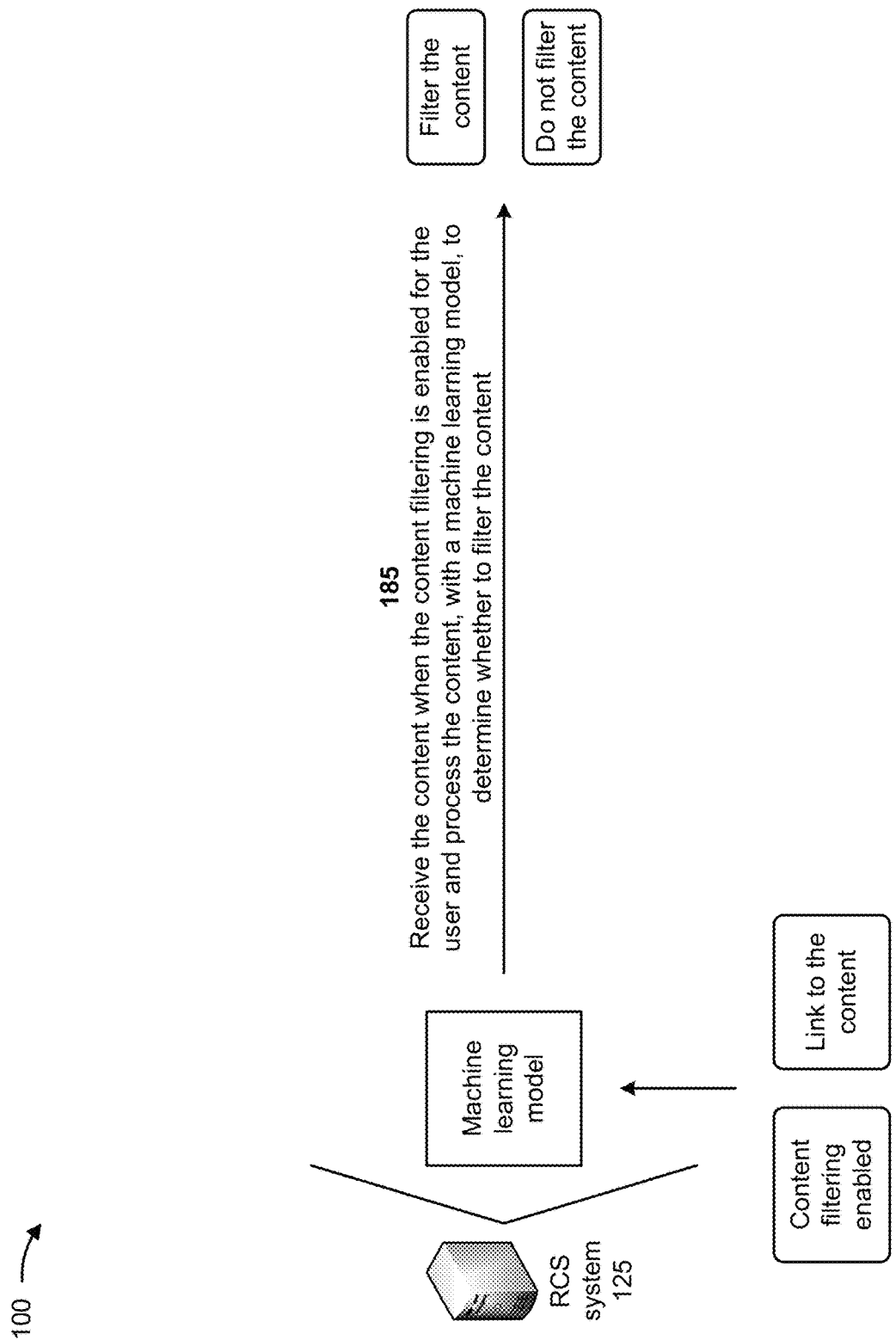

SYSTEMS AND METHODS FOR FILTERING CONTENT PROVIDED VIA TEXT MESSAGES

BACKGROUND

Content control software is software that restricts or controls content that a user is able to access, such as restricting content delivered over a network via a browser or via email. The content-control software determines what content will be available or be blocked.

BRIEF DESCRIPTION OF THE DRAWINGS

FIGS. 1A-1G are diagrams of an example associated with filtering content provided via messages.

DETAILED DESCRIPTION OF PREFERRED EMBODIMENTS

Figure 1A:
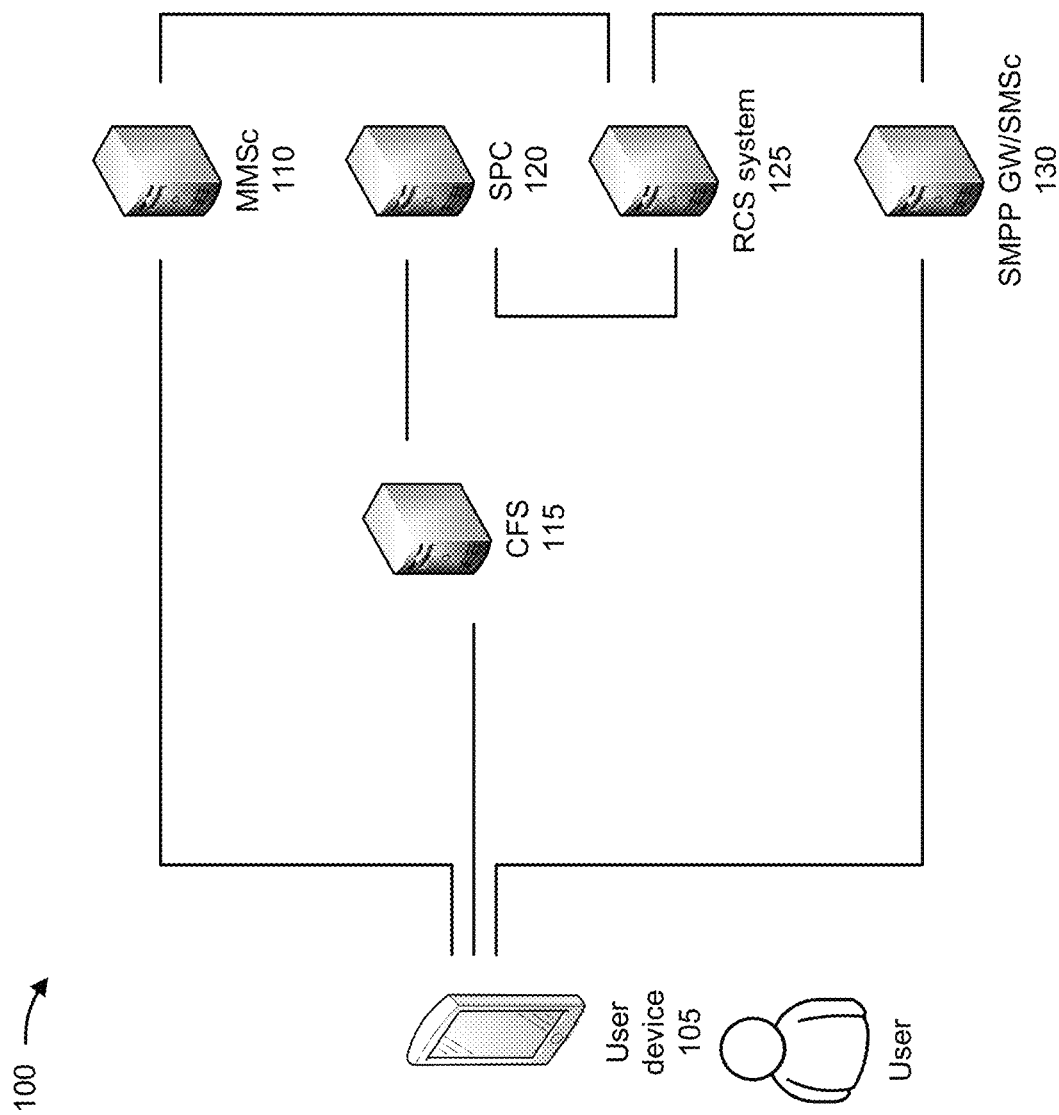

The following detailed description of example implementations refers to the accompanying drawings. The same reference numbers in different drawings may identify the same or similar elements.

Current techniques for filtering content (e.g., objectionable content) are limited to utilizing third party database lookups for blocking websites and applications. However, current techniques for filtering content do not prevent objectionable content from being provided via text messages. For example, a user device may provide objectionable content to another user device via a text message (e.g., a short message service (SMS) message or a multimedia messaging service (MMS) message), without the objectionable content being blocked. Failing to prevent objectionable content from being provided via text messages between user devices waste computing resources (e.g., processing resources, memory resources, communication resources, among other examples), networking resources, and other resources associated with causing the objectionable content to be deleted from the user devices, causing the text messages to be deleted from the user devices, searching the user devices for additional objectionable content, deleting such additional objectionable content, configuring the user devices to prevent objectionable content from being provided and/or received via additional text messages, among other examples of remedial actions with respect to objectionable content being provided via text messages.

Some implementations described herein provide a rich communication services (RCS) system that filters content provided via messages transmitted by user devices. For example, the RCS system may receive, from a first user device, a message associated with content. The message may be transmitted by the first user device and destined for a second user device. The message may include an MMS message, an SMS message, an RCS message, an instant message, among other examples of messages that may be transmitted by the first user device and destined for the second user device. The message may include text, images, video, or other content types that may be considered objectionable. In some examples, the message may contain harmful language, spam, phishing and fraud attempts, or other unwanted messages transmitted by the first user device and destined for the second user device. The RCS system may receive subscription data associated with a user of the first user device and including information indicating whether content filtering is enabled for the user. The RCS system may determine whether content filtering is enabled for the user based on the subscription data (e.g., based on the information indicating whether content filtering is enabled for the user). The RCS system may process the content, when the content filtering is enabled for the user, to determine whether to filter the content. For example, the RCS system may process the content using a machine learning model (e.g., a classifier machine learning model) to determine whether to filter the content (e.g., determine whether to prevent the content from being provided to the second user device). The RCS system may perform one or more actions based on whether the content is to be filtered.

As described herein, the RCS system filters content provided via messages (e.g., MMS messages, SMS messages, RCS messages, instant messages, among other examples). For example, messages (e.g., with content that may potentially be objectionable) provided by and/or intended for a user device may be redirected to the RCS system. The RCS system may utilize a machine learning model to determine whether to filter the content of the messages (e.g. to prevent objectionable content from being provided and/or received via the messages). Thus, the RCS system conserves computing resources, networking resources, and other resources that would otherwise have been consumed by causing objectionable content to be deleted from the user device, causing the messages to be deleted from the user device, searching the user device for additional objectionable content, deleting such additional objectionable content, configuring the user device to prevent objectionable content from being provided and/or received via additional messages, among other examples. Additionally, utilizing the machine learning model may improve identification of objectionable content and improve filtering of objectionable content.

FIGS. 1A-1G are diagrams of an example 100 associated with filtering content provided via messages. As shown in FIG. 1A, example 100 includes a user device 105, a multimedia messaging service center (MMSc) device 110, a Client fallback to short message service (SMS) (CFS) device 115, a subscriber profiler controller (SPC) device 120, an RCS system 125, and a short message peer-to-peer gateway/short message service center (SMPP GW/SMSc) 130. User device 105, MMSc device 110, CFS device 115, SPC device 120, RCS system 125, and SMPP GW/SMSc 130 are described in more detail below in connection with FIG. 2.

User device 105 may include a mobile user device. MMSc device 110 may include one or more devices that implement a messaging platform for receiving and transmitting messages (e.g., MMS messages). The messages may include pictures, videos, contact cards, among other examples. The messages may be received and transmitted in accordance with an MMS protocol. CFS device 115 may include one or more devices that are used to implement an RCS file transfer (e.g., transfer of content between user devices in accordance with an RCS protocol). In some examples, the RCS file transfer may accommodate the transfer of content with large file size (e.g., between user devices). CFS device 115 may store content (e.g., files) that are uploaded and subsequently downloaded as part of transmission of RCS messages (e.g., in accordance the RCS protocol) between user devices. In some implementations, CFS device 115 may include a content data structure (e.g., a database, a table, and/or a linked list) that stores the content.

SPC device 120 may include one or more devices that include a subscription data structure storing subscription data in association with subscriber information (e.g., associated with different users). The subscription data, for a particular user, may include content filtering information indicating whether content (e.g., transmitted and/or received by a particular user device of the particular user) is to be filtered. The subscriber information, associated with the particular user, may include information identifying the particular user, information identifying the particular user device, among other examples. In some implementations, the subscriber information (and/or the subscription data) may further include information that may be used to authenticate the particular user and/or to determine features (or services) provisioned for the particular user.

RCS system 125 may include one or more devices that implement a messaging platform that supports transmitting and receiving messages in accordance with the RCS protocol. For example, RCS system 125 may support group messaging, may provide typing indicators for messages, may provide read receipts for messages, among other examples. SMPP GW/SMSc 130 may include one or more devices that implement a messaging platform for receiving and transmitting messages (e.g., SMS messages). The messages may be received and transmitted in accordance with an SMS protocol.

In the example that follows, assume that a user desires to use user device 105 (e.g., a first user device) to transmit a message including content (e.g., an image, a video, among other examples) to a terminating user device (e.g., a second user device). In this regard, assume that the user causes a messaging application, of user device 105, to be initiated to enable the user to compose the message and select the content and to cause user device 105 to transmit the message containing the content. The message may be transmitted as an MMS message, an SMS message, an RCS message, among other examples. Whether the message is transmitted as an MMS message, an SMS message, or an RCS message may be based on a type of messaging application is used, a type of network that user device 105 is connected to, a type of content to be provided with the message, among other examples.

Further assume that messages, transmitted by the user using user device 105, are monitored by another user. For example, assume that messages, transmitted by the user using user device 105, are monitored by a guardian of the user (or some other authority figure of the user). For example, the guardian may be a parent of the user (e.g., a juvenile or a person with a mental deficiency) or may be a child of the user (e.g., an elderly person). Further assume that the guardian of the user is associated with a user device (e.g., a third user device) that may receive notifications regarding messages transmitted by user device 105. Further assume that the guardian has caused subscription data (for the user) to include content filtering information indicating that content (e.g., transmitted and/or received by user device 105) is to be filtered.

Figure 1B:
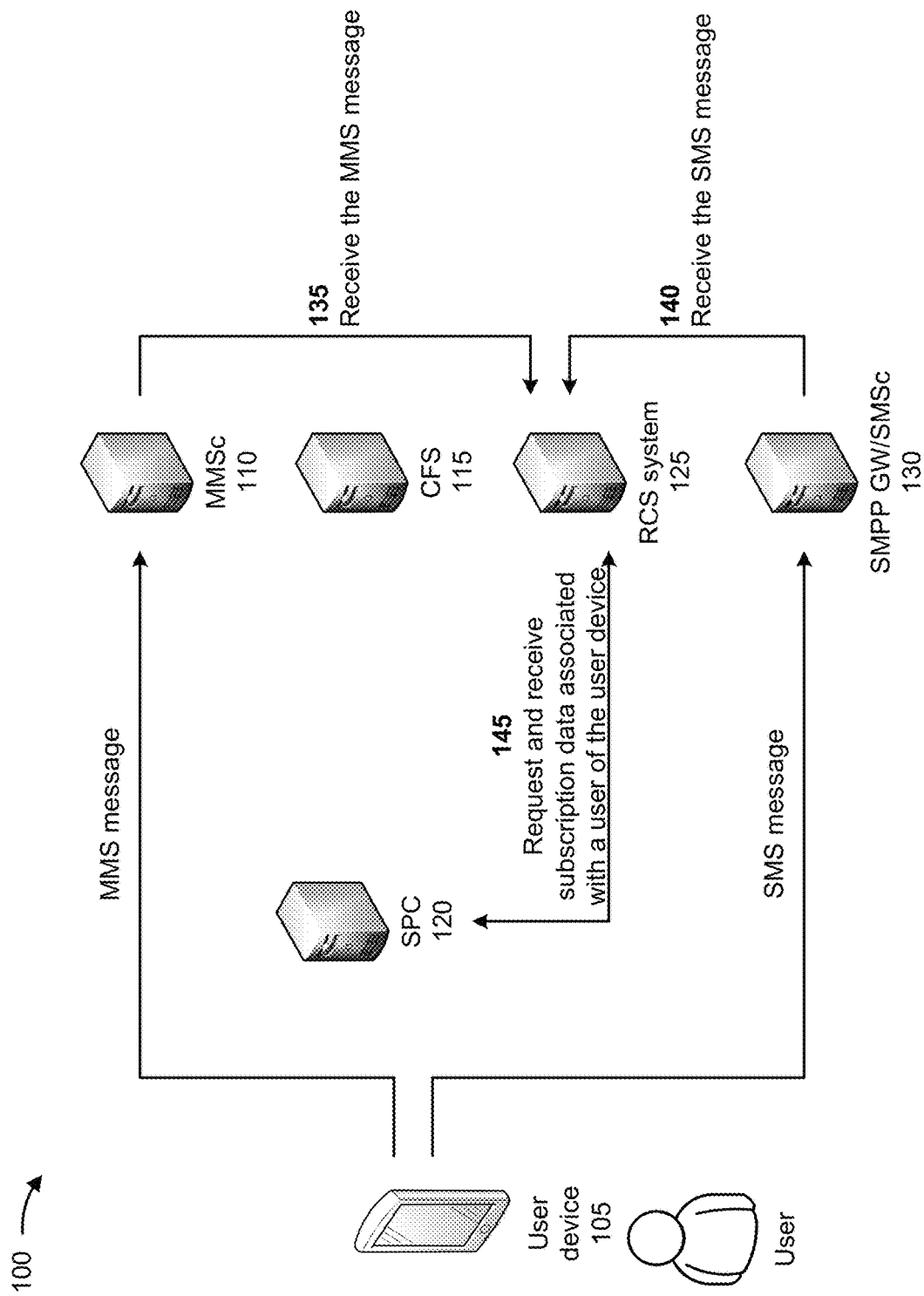

In a first example implementation as shown in FIG. 1B, assume that the message (composed by the user via the messaging application) is an MMS message (e.g., an MMS message). In some examples, the messaging application may cause user device 105 to transmit the MMS message, with the content, toward the terminating user device (e.g., in accordance with the MMS protocol).

In some implementations, the messaging application may cause user device 105 to transmit messages in accordance with the MMS protocol based on input (from the user via user device 105) indicating that messages are to be transmitted in accordance with the MMS protocol. Alternatively, the messaging application may cause user device 105 to transmit messages in accordance with the MMS protocol without such input. The MMS message (transmitted by user device 105 in accordance with the MMS protocol) may be received by MMSc device 110.

As shown in FIG. 1B, and by reference number 135, RCS system 125 may receive the MMS message from MMSc device 110. In some implementations, MMSc device 110 may be pre-configured to forward MMS messages to RCS system 125 for processing (e.g., to determine whether the content is to be filtered). For example, MMSc device 110 may store (e.g., in a memory associated with MMSc device 110) forwarding information that causes MMSc device 110 to forward the MMS message to RCS system 125 for processing. For instance, the forwarding information may include a telephone number associated with the user, a network address associated with user device 105, and/or other information that may be used to identify the user and/or user device 105. In some implementations, the forwarding information may be provided by the user device of the guardian to a device of a network operator associated with MMSc device 110. The device of the network operator may transmit the forwarding information to MMSc device 110 for storage. The forwarding information (transmitted by the device of the network operator) may further include information identifying RCS system 125 (e.g., a network address of RCS system 125).

In some examples, when MMSc device 110 receives the MMS message, MMSc device 110 may compare the forwarding information and information regarding the MMS message to determine whether the MMS message is to be forwarded to RCS system 125 for processing. By comparing the forwarding information and the information regarding the MMS, MMSc device 110 may preserve computing resources, network resources, and other resources that would have been used by MMSc device 110 to forward all MMS messages (received by MMSc device 110) to RCS system 125.

Based on comparing the forwarding information and the information regarding the MMS, MMSc device 110 may redirect (or forward) the MMS message to RCS system 125 for processing (e.g., to determine whether the content is to be filtered). RCS system 125 may receive the MMS message redirected by MMSc device 110 and may process the MMS as explained in more detail below.

In a second example implementation as shown in FIG. 1B, assume that the message (composed by the user via the messaging application) is an SMS message. In some examples, the messaging application may cause user device 105 to transmit the SMS message, with the content, toward the terminating user device (e.g., in accordance with the SMS protocol).

In some implementations, the messaging application may cause user device 105 to transmit messages in accordance with the SMS protocol based on input (from the user via user device 105) indicating that messages are to be transmitted in accordance with the SMS protocol. Alternatively, the messaging application may cause user device 105 to transmit messages in accordance with the SMS protocol without such input. The SMS message (transmitted by user device 105 in accordance with the MMS protocol) may be received by SMPP GW/SMSc 130.

As shown in FIG. 1B, and by reference number 140, RCS system 125 may receive the SMS message from SMPP GW/SMSc 130. In some implementations, SMPP GW/SMSc 130 may be pre-configured to forward SMS messages to RCS system 125 for processing (e.g., to determine whether the content is to be filtered). For example, SMPP GW/SMSc 130 may store (e.g., in a memory associated with SMPP GW/SMSc 130) forwarding information that causes SMPP GW/SMSc 130 to forward the SMS message to RCS system 125 for processing. For instance, the forwarding information may include the telephone number associated with the user, the network address associated with user device 105, and/or other information that may be used to identify the user and/or user device 105. In some implementations, the forwarding information may be provided by the user device of the guardian to a device of a network operator associated with SMPP GW/SMSc 130. The device of the network operator may transmit the forwarding information to SMPP GW/SMSc 130 for storage. The forwarding information (transmitted by the device of the network operator) may further include the information identifying RCS system 125 (e.g., a network address of RCS system 125).

In some examples, when SMPP GW/SMSc 130 receives the SMS message, SMPP GW/SMSc 130 may compare the forwarding information and information regarding the SMS message to determine whether the SMS message is to be forwarded to RCS system 125 for processing. By comparing the forwarding information and the information regarding the SMS, SMPP GW/SMSc 130 may preserve computing resources, network resources, and other resources that would have been used by SMPP GW/SMSc 130 to forward all SMS messages (received by SMPP GW/SMSc 130) to RCS system 125.

Based on comparing the forwarding information and the information regarding the SMS message, SMPP GW/SMSc 130 may redirect (or forward) the SMS message to RCS system 125 for processing (e.g., to determine whether the content is to be filtered). RCS system 125 may receive the SMS message redirected by SMPP GW/SMSc 130 and may process the MMS as explained in more detail below.

As shown in FIG. 1B, and by reference number 145, RCS system 125 may request and receive subscription data associated with a user of user device 105. For example, based on receiving the message (e.g., receiving the MMS message from MMSc device 110 or receiving the SMS message from SMPP GW/SMSc 130), RCS system 125 may request and receive subscription data associated with the user of user device 105. In some implementations, RCS system 125 may be preconfigured to request subscription data associated with users of user devices that transmit messages redirected to RCS system 125. Additionally, or alternatively, the message may include subscriber inquiry information that causes RCS system 125 to request the subscription data associated with the user of user device 105.

RCS system 125 may generate a request for the subscription data (e.g., based on being preconfigured and/or based on the subscriber inquiry information). The request for the subscription data may include subscriber information associated with the user of user device 105. In some implementations, RCS system 125 may analyze the message to obtain the subscriber information. The subscriber information may include information identifying the user, information identifying user device 105, among other examples. The information identifying the user may include an identifier of the user, a username of the user, a password of the user, a telephone number associated with the user, among other examples. The information identifying user device 105 may include an international mobile subscriber identity (IMSI) number, an international mobile equipment identity (IMEI) number, a mobile station international subscriber directory number (MSISDN), a network address, among other examples.

RCS system 125 may provide, to SPC device 120, the request for the subscription data. In some implementations, the request may cause SPC device 120 to perform a lookup of the subscription data structure using the subscriber information included in the request. Based on performing the lookup, SPC device 120 may identify the subscription data associated with the subscriber information and provide the subscription data to RCS system 125. RCS system 125 may receive the subscription data from SPC device 120 (e.g., based on transmitting the request). RCS system 125 may use the subscription data to determine whether the content (included in the message) is to be filtered, as explained in more detail below.

In connection with FIG. 1B, a first example implementation has been described in which an MMS message is transmitted by user device 105 and a second example implementation has been described in which an SMS message is transmitted by user device 105. In a third example implementation as shown in FIG. 1C, assume that the message (composed by the user via the messaging application) is an RCS message.

In some implementations, the messaging application may cause user device 105 to transmit messages in accordance with the RCS protocol based on input (from the user via user device 105) indicating that messages are to be transmitted in accordance with the RCS protocol. Alternatively, the messaging application may cause user device 105 to transmit messages in accordance with the RCS protocol without such input.

Figure 1C:
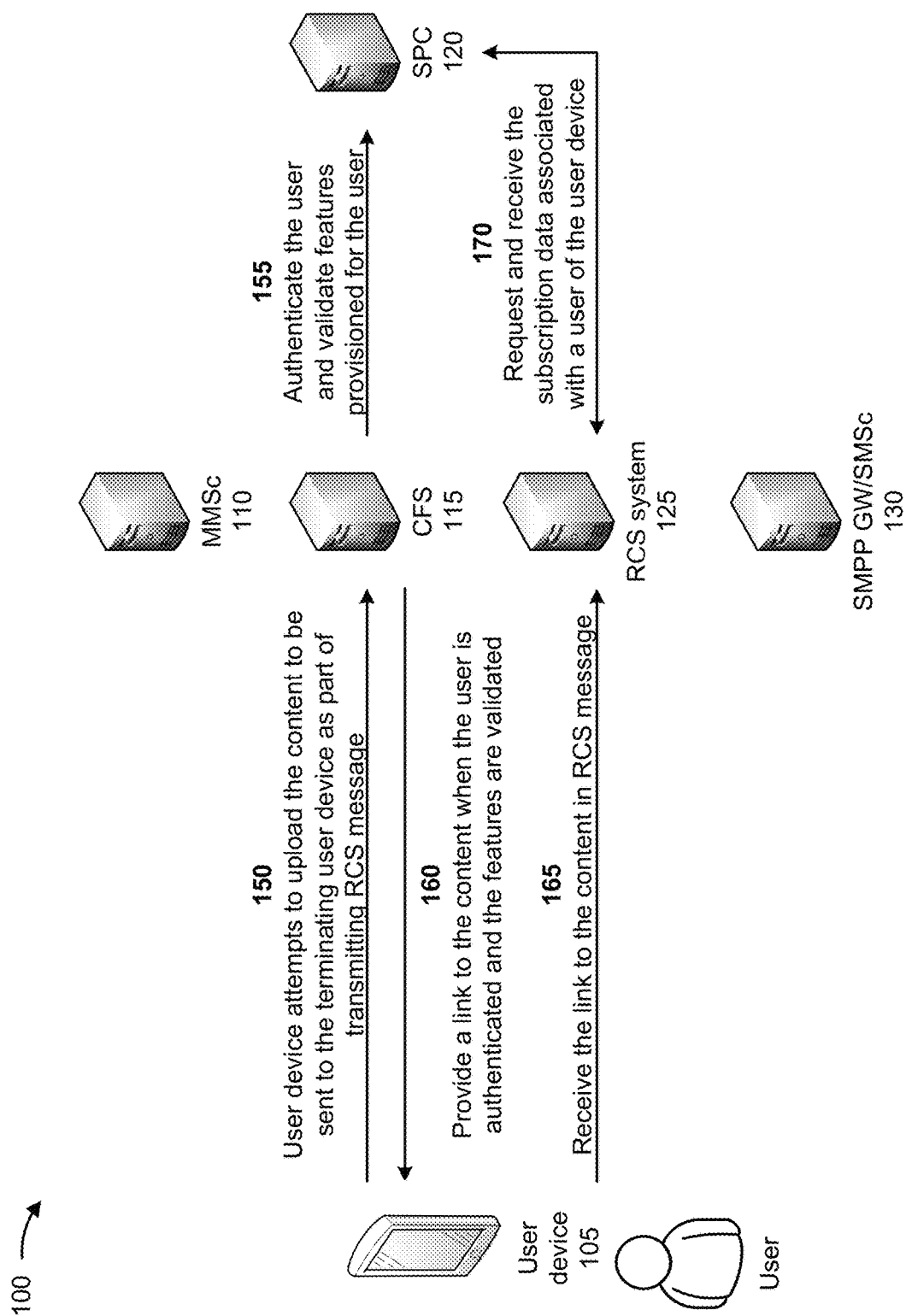

As shown in FIG. 1C, and by reference number 150, user device 105 may attempt to upload the content to be sent to the terminating user device as part of transmitting the RCS message. In some examples, as part of transmitting the RCS message in accordance with the RCS protocol, user device 105 may transmit, to CFS device 115, a content upload request to upload the content to CFS device 115. The content upload request may include the information identifying the user, the information identifying user device 105, the content, information identifying the terminating user device (which may include types of information similar to the types of information identifying user device 105), among other examples. The information identifying the user and the information identifying user device 105 have been described above.

As shown in FIG. 1C, and by reference number 155, CFS device 115 may authenticate the user and validate features provisioned for the user. For example, based on receiving the content upload request, CFS device 115 may transmit a user authentication request to authenticate the user and validate the features provisioned for the user. CFS device 115 may transmit the user authentication request to SPC device 120. In some implementations, the user authentication request may include the information identifying the user and/or the information identifying user device 105.

SPC device 120 may receive the user authentication request and may authenticate the user based on the information identifying the user and/or the information identifying user device 105 (included in the user authentication request). In some examples, SPC device 120 may obtain the subscription data of the user in a manner similar to the manner described above in connection with reference number 145 and may use the subscription data to authenticate the user.

In some implementations, SPC device 120 may authenticate the user based on the username and the password included in the information identifying the user. For example, SPC device 120 may determine whether the username and the password, included in the information identifying the user, match a username and a password stored by SPC device 120 (e.g., included in the subscription data). Additionally, or alternatively, to authenticating the user based on the username and the password, SPC device 120 may authenticate the user using a Subscriber Identity Module (SIM) based authentication technique. For example, SPC device 120 may authenticate the user using an Extensible Authentication Protocol SIM (EAP-SIM) authentication technique (e.g., based on the IMSI number of user device 105 and a key related to the IMSI number).

Additionally, or alternatively, SPC device 120 may authenticate the user using a Session Initiation Protocol (SIP) based authentication technique (e.g., SIP Digest Authentication Scheme). Additionally, or alternatively, SPC device 120 may authenticate the user using a one-time personal identification number (PIN) code. The above authentication techniques are merely provided as examples. Other authentication techniques or combinations of authentication techniques may be used in some situations.

In some examples, SPC device 120 may use the subscription data to validate the features provisioned for the user. For example, SPC device 120 may analyze the subscription data to determine whether user device 105 has been provisioned with an appropriate RCS configuration (e.g., provisioned to support RCS features such as group messaging, typing indicators for messages, read receipts for messages, RCS file transfer, among other examples).

As shown in FIG. 1C, and by reference number 160, CFS device 115 may provide a link to the content when the user is authenticated and the features are validated. For example, assume that SPC device 120 has authenticated the user and has validated the features provisioned for the user. SPC device 120 may provide, to CFS device 115, an indication (e.g., as a response to the user authentication request) that the user has been authenticated and the features (provisioned for the user) have been validated. Based on receiving the indication from SPC device 120, CFS device 115 may store (e.g., in the content data structure) the content in association with the information identifying the user, the information identifying user device 105, and/or the information identifying the terminating user device.

CFS device 115 may provide (e.g., to user device 105) a link to the content stored in the data structure. The link may be used to retrieve (e.g., download) the content from the data structure. In some examples, CFS device 115 may provide, with the link, an indication that the content was successfully uploaded. Alternatively, CFS device 115 may provide the link as an indication that the content was successfully uploaded. User device 105 may receive the link to the content from CFS device 115.

As shown in FIG. 1C, and by reference number 165, RCS system 125 may receive the link to the content in the RCS message. For example, based on receiving the link to the content, user device 105 may provide the link to the content to RCS system 125. In some examples, user device 105 may provide the link to the content in the RCS message. RCS system 125 may receive the RCS message and receive the link the to the content from user device 105.

As shown in FIG. 1C, and by reference number 170, RCS system 125 may request and receive the subscription data associated with a user of user device 105. In some examples, RCS system 125 may request and receive the subscription data associated with the user in a manner similar to the manner described above in connection with reference number 145 of FIG. 1B. In this instance, the subscriber information may be included in the RCS message and RCS system 125 may obtain the subscriber information from the RCS message.

Figure 1D:
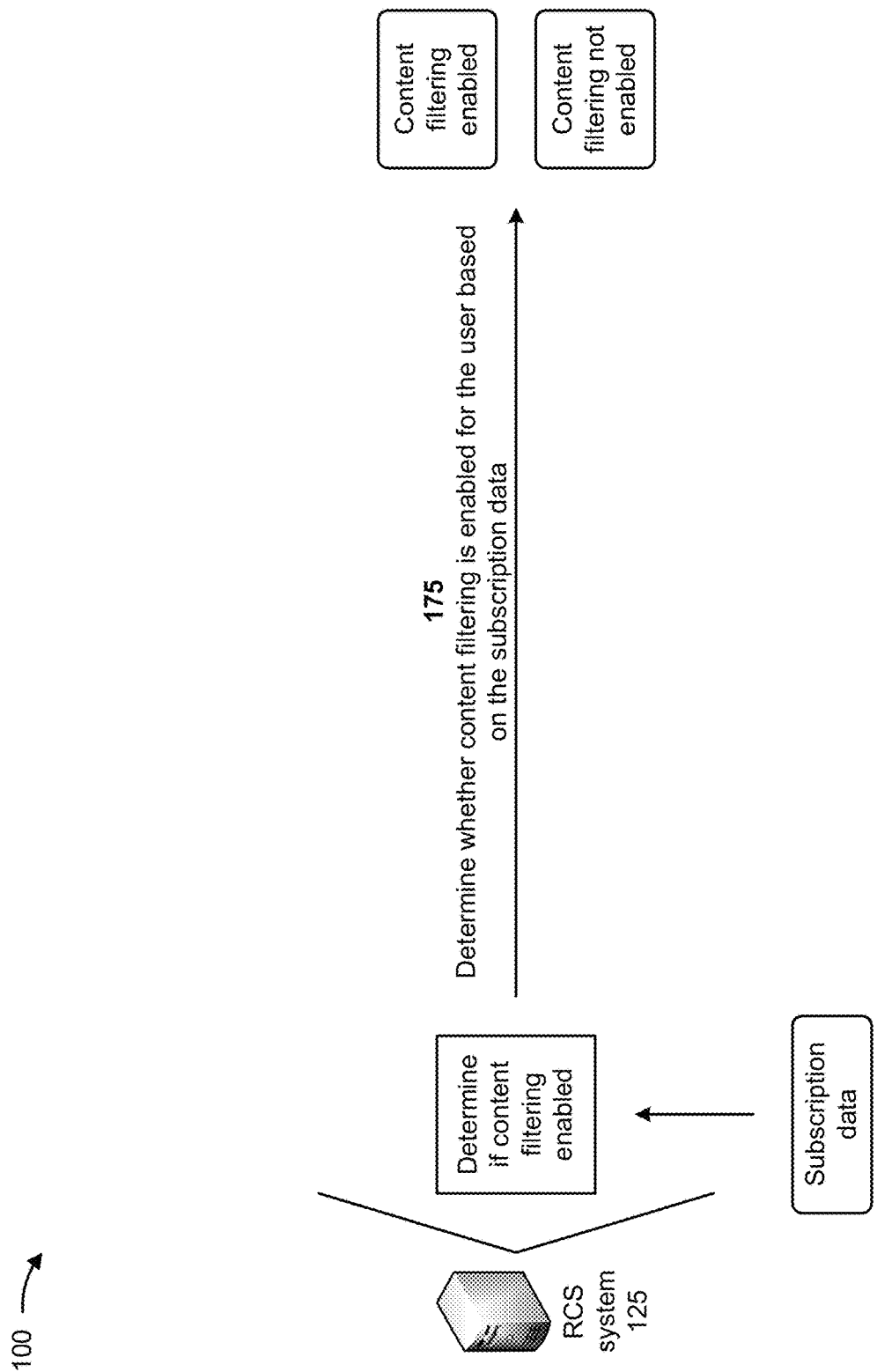

As shown in FIG. 1D, and by reference number 175, RCS system 125 may determine whether content filtering is enabled for the user based on the subscription data. In some implementations, RCS system 125 may analyze the subscription data to determine whether the subscription data includes the content filtering information. In some examples, RCS system 125 may determine whether content filtering is enabled for the user based on determining whether the subscription data includes the content filtering information. For example, RCS system 125 may determine that content filtering is not enabled for the user when the subscription data does not include the content filtering information.

If the subscription data includes the content filtering information, RCS system 125 may determine whether the content filtering information indicates whether content filtering is enabled for the user. For example, RCS system 125 may determine that content filtering is not enabled for the user when the content filtering information indicates that content filtering is not enabled for the user. Alternatively, RCS system 125 may determine that content filtering is enabled for the user when the content filtering information indicates that content filtering is enabled for the user.

Figure 1E:
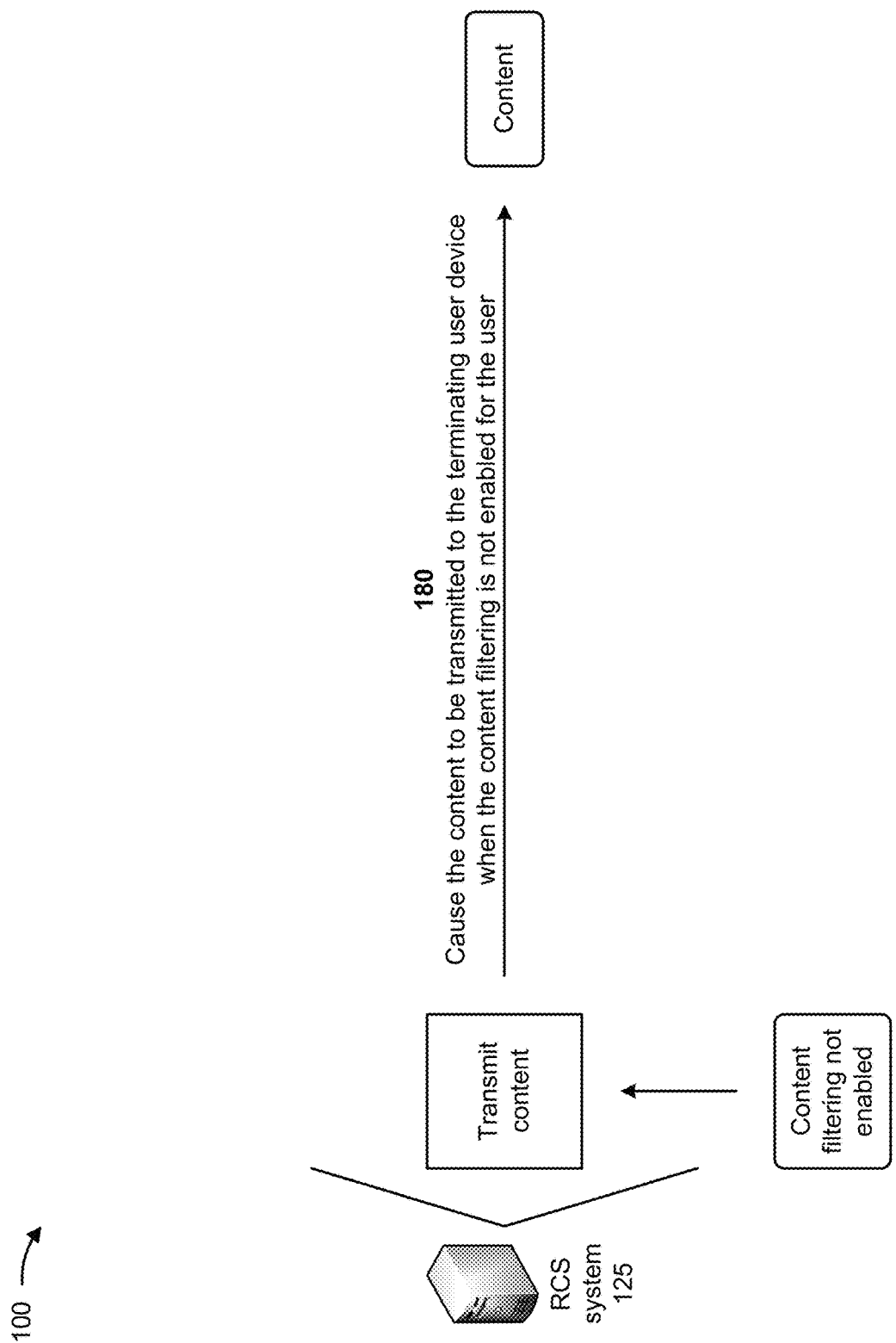

As shown in FIG. 1E, and by reference number 180, RCS system 125 may cause the content to be transmitted to the terminating user device when the content filtering is not enabled for the user. For example, assume that RCS system 125 determines that content filtering is not enabled for the user (e.g., because the subscription data does not include the content filtering information or because the subscription data includes the content filtering information and the content filtering information indicates that content filtering is not enabled for the user). Based on determining that content filtering is not enabled for the user, RCS system 125 may cause the content to be transmitted to the terminating user device, via the message, without processing the content to determine whether to filter the content.

As shown in FIG. 1F, and by reference number 185, RCS system 125 may obtain the content when the content filtering is enabled for the user and process the content, with a machine learning model, to determine whether to filter the content. For example, assume that RCS system 125 determines that the subscription data includes the content filtering information and that the content filtering information indicates that content filtering is enabled for the user. Based on determining that content filtering is enabled for the user, RCS system 125 may cause the content to be processed, with the machine learning model, to determine whether to filter the content (e.g., to determine whether to prevent the content from being transmitted to the terminating user device).

In some implementations, RCS system 125 may obtain the content (e.g., from the message when the message is the MMS message or the SMS message). Alternatively, RCS system 125 may obtain the link to the content (e.g., from the message when the message is the RCS message) and use the link to the retrieve the content from the content data structure of CFS device 115. For example, RCS system 125 may use the link to cause a request to be transmitted, to CFS device 115, to retrieve the content. RCS system 125 may provide the content (obtained from the message or retrieved using the link), as an input, to the machine learning model to determine whether the content is to be filtered. In some examples, an interface defined for the machine learning model (e.g., an interface for communication between RCS system 125 and the machine learning model) may include a Representational state transfer (REST) based on application program interface (API). In this regard, recognition and response by the machine learning process (e.g., processing and prediction regarding content) may be performed in an asynchronous manner.

In some implementations, RCS system 125 may include the machine learning model. Alternatively, the machine learning model may be included in a device and/or service separate from RCS system 125. In such an instance, RCS system 125 may provide the link to the content to the device that includes the machine learning model (or to the machine learning model) or may provide the RCS message including the link to the content to the device that includes the machine learning model (or to the machine learning model). The device that includes the machine learning model (or the machine learning model) may use the link to retrieve the content in a manner similar to the manner described above.

In some implementations, the machine learning model may include a classifier machine learning model (e.g., an image classifier machine learning model). The machine learning model may be trained based on historical data. The historical data may include historical messages, historical content (e.g., included in the historical messages), historical classes (e.g., data identifying items associated with objectionable content) identified in the historical images, historical classification regarding the historical content, historical feedback regarding the historical classification, historical data indicating whether the historical content was filtered, historical objectionable content thresholds, among other examples.

As an example, the machine learning model may be trained to identify using computer vision techniques, content that includes the items associated with the objectionable content. The items may include, for example, items associated with nudity, drug use, alcohol use, inherently dangerous activities, bullying, violence, weapons, fishing attack content, among other examples of items that are inappropriate for certain users (e.g., juvenile users, elderly users, users with certain mental deficiencies, among other examples). In some examples, the historical classification may indicate whether the historical content was classified as objectionable content or non-objectionable content. The historical objectionable content thresholds may include thresholds used to determine whether the historical content is objectionable (e.g., objectionable with respect to a juvenile user) and is to be filtered.

In some implementations, RCS system 125 and/or the device that includes the machine learning model may cause one or more operations to be performed on the historical content prior to training the machine learning model with the historical content. For example, RCS system 125 and/or the device may cause an image resizing of the historical content (e.g., to resize a height and/or width of the historical content), may cause a reduction of noise in the historical content (e.g., using a Gaussian blur technique among other examples), may cause data of the historical content to be normalized using one or more data normalization techniques, may cause the data of the historical content to be augmented using one or more data augmentation techniques, among other examples.

Causing the one or more operations to be performed on the historical content prior to training the machine learning model may improve an accuracy of the machine learning model in determining (or predicting) whether the content is to be filtered. Improving the accuracy of the machine learning mode may improve speed and efficiency of the machine learning model and, thereby, conserve computing resources, network resources, among other examples.

In some implementations, RCS system 125 may train the machine learning model. Alternatively, rather than training the machine learning model, RCS system 125 may receive a trained machine learning model from a device (e.g., the device that the includes the machine learning model). For example, the device may generate the trained machine learning model in a manner similar to the manner described above, and may provide the trained machine learning model to RCS system 125.

In some implementations, when processing the content, the machine learning model may use pixel data (e.g., raw pixel data) of the content as input. Additionally, or alternatively, the machine learning model may use features derived from the pixel data such as color histograms, textures, and/or shapes. When processing the content, the machine learning model may use one or more machine learning techniques for image classification such as a Convolutional Neural Networks (CNN) technique, Support Vector Machine (SVM) technique, K-Nearest Neighbor (KNN) technique, Multi-Layer Perceptron (MLP) technique, among other examples.

In some implementations, the machine learning model may process the content to determine whether the content satisfies an objectionable content threshold. For example, an output of the machine learning model may indicate whether the content satisfies the objectionable content threshold. RCS system 125 may determine that the content is to be filtered (and is not to be provided to the terminating user device) when the content satisfies the objectionable content threshold. Alternatively, RCS system 125 may determine that the content is not to be filtered when the content fails to satisfy the objectionable content threshold (and is to be provided to the terminating user device).

The objectionable content threshold may include a value indicating whether content is objectionable and is to be filtered (e.g., is not to be provided). In some implementations, the output of the machine learning model may be a value (e.g., a score) and RCS system 125 (and/or the machine learning model) may compare the value and the objectional content threshold to determine whether the content satisfies the objectionable content threshold. In some implementations, RCS system 125 may receive the objectionable content threshold. For example, the objectionable content threshold may be included in the subscription data or in the content filtering information. As an example, the objectional content threshold may be set by the user or the guardian of the user.

In some implementations, the machine learning model may be trained to provide one or more classifications of the objectionable content (e.g., weapons, nudity, violence, among other examples described above) and to generate a score for each classification. RCS system 125 may determine whether the objectionable content is to be filtered based on the one or more classifications and the one or more scores.

Figure 1G:
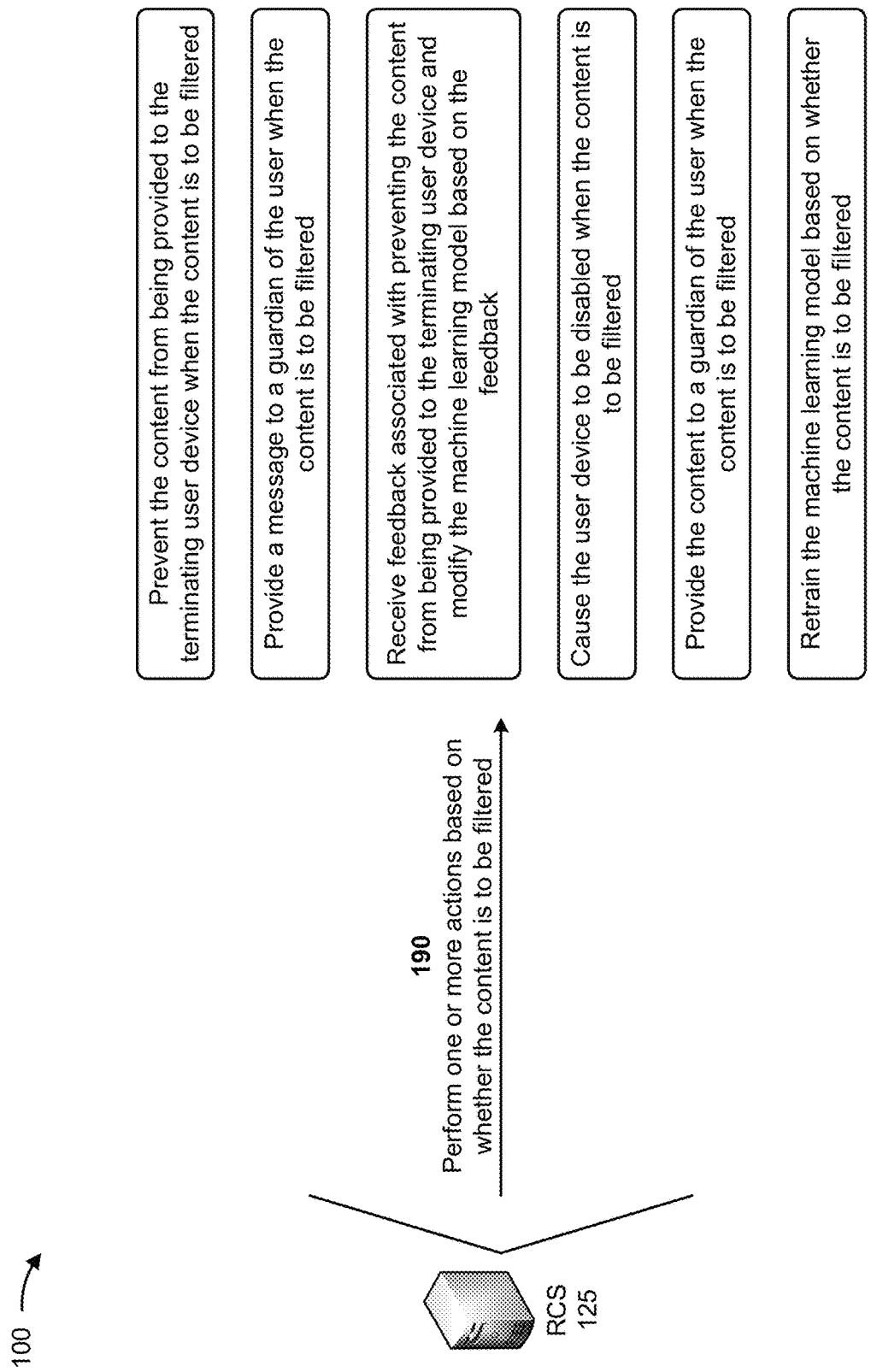

As shown in FIG. 1G, and by reference number 190, RCS system 125 may perform one or more actions based on whether the content is to be filtered. For example, assume, based on a result of processing the content, that RCS system 125 determines that the content is to be filtered. RCS system 125 may perform the one or more actions based on determining that the content is to be filtered. In some implementations, the one or more actions may include preventing the content from being provided to the terminating user device when the content is to be filtered. In some examples, RCS system 125 may cause the content to be deleted from the content data structure. For example, RCS system 125 may provide a request to CFS device 115 to cause the content to be deleted from the content data structure.

Additionally, or alternatively, to causing the content to be deleted from the content data structure, RCS system 125 may cause a copy of the content to be deleted from a memory of user device 105. For example, RCS system 125 may provide a request to user device 105 to cause the content to be deleted from the memory of user device 105. Additionally, or alternatively, to causing the content to be deleted from the memory of user device 105, RCS system 125 may cause the message to be deleted from the memory of user device 105. For example, RCS system 125 may provide a request to user device 105 to cause the message to be deleted from the memory of user device 105.

In some implementations, the one or more actions may include providing a message to the guardian of the user when the content is to be filtered. For example, RCS system 125 may provide the message to the user device of the guardian. In some examples, the message may indicate that the user attempted to send the content via the message to the terminating user device and that the content has been filtered (e.g., the content was prevented from transmitted to the terminating user device). In some implementations, the subscription data may include information identifying the guardian and information identifying the user device of the guardian. RCS system 125 may obtain the information identifying the guardian and the information identifying the user device of the guardian from the subscription data and may provide the message based on the information identifying the guardian and the information identifying the user device of the guardian.

The information identifying the guardian may include an identifier of the guardian, a username of the guardian, a telephone number associated with the guardian, among other examples. The information identifying the user device of the guardian may include an IMSI number, an IMEI number, an MSISDN, a network address, among other examples. As an example, RCS system 125 may provide the message to the user device of the guardian based on the telephone number, the network address, among other examples. In some examples, the message may include an SMS message. In this regard, the SMS message may be provided to SMPP GW/SMSc 130 to cause SMPP GW/SMSc 130 to provide the message to the user device of the guardian.

In some implementations, the one or more actions may include receiving feedback associated with preventing the content from being provided to the terminating user device and modify the machine learning model based on the feedback. For example, based on determining that the content is to be filtered, RCS system 125 may prevent the content from being provided to the terminating user device. RCS system 125 may provide the message (indicating that the user attempted to send the content via the message) to the user device of the guardian and may receive feedback from the user device of the guardian based on providing the message. In some examples, the feedback may confirm that the content is to be filtered. Alternatively, the feedback may indicate that the content is not to be filtered (e.g., an indication of a false positive).

In some implementations, RCS system 125 may cause the machine learning model to be retrained based on the feedback. Retraining the machine learning model based on the feedback may improve an accuracy of the machine learning model in determining whether content is to be filtered. Improving the accuracy of the machine learning mode may improve speed and efficiency of the machine learning model and conserve computing resources, network resources, among other examples.

In some implementations, the one or more actions may include causing the user device to be disabled when the content is to be filtered. In some examples, RCS system 125 may transmit an instruction to user device 105 to cause all applications of user device 105 to be disabled. Alternatively, RCS system 125 may transmit an instruction to user device 105 to cause one or more applications associated with transmitting the message to be disabled. For example, RCS system 125 may cause the messaging application, a camera application, among other examples to be disabled. In some examples, RCS system 125 may be pre-configured with information identifying the applications (described above) that are to be disabled. Additionally, or alternatively, RCS system 125 may obtain the information identifying the applications from the subscription data. In some instances, the information identifying the applications (included in the subscription data) may be identified by the guardian of the user.

In some implementations, RCS system 125 may cause the applications (discussed above) to be disabled until RCS system 125 detects a trigger (e.g., until RCS system 125 receives a notification from the user device of the guardian). Additionally, or alternatively, RCS system 125 may cause the applications (discussed above) to be disabled for a period of time. In some examples, RCS system 125 may be pre-configured with information identifying the period of time. Additionally, or alternatively, RCS system 125 may obtain the information identifying the period of time from the subscription data. In some instances, the information identifying the period of time (included in the subscription data) may be identified by the guardian of the user.

In some implementations, the one or more actions may include providing the content to the guardian of the user when the content is to be filtered. In some examples, RCS system 125 may provide, to the user device of the guardian, a message including the content in a manner similar to the manner described above with respect to providing the message indicating that the content has been filtered.

In some implementations, the one or more actions may include retraining the machine learning model based on whether the content is to be filtered. For example, RCS system 125 may retrain the machine learning model in a manner similar to the manner described above.

As explained herein, RCS system 125 filters content provided via messages. For example, messages (e.g., with potentially objectionable content) from user device 105 may be redirected to RCS system 125. RCS system 125 may utilize a machine learning model to determine whether to filter the content of the messages (e.g., MMS messages, SMS messages, RCS messages, instant messages, among other examples of messages transmitted by user devices). Thus, RCS system 125 conserves computing resources, networking resources, and other resources that would otherwise have been consumed by causing objectionable content to be deleted from the user device, causing the messages to be deleted from the user device, searching the user device for additional objectionable content, deleting such additional objectionable content, configuring the user device to prevent objectionable content from being provided and/or received via additional messages, among other examples.

In some implementations, RCS system 125 may be configured to filter messages based on information identifying authorized recipients. In some examples, the information identifying authorized recipients may be included in the content filtering information (or in the subscription data). For instance, RCS system 125 may analyze a message to identify one or more recipients of the message. RCS system 125 may determine whether the one or more recipients are identified in the information identifying the authorized recipients. RCS system 125 may prevent the message from being provided if the one or more recipients are not identified in the information identifying the authorized recipients.

While the foregoing examples have been described with respect to a first user device transmitting a message (including content) to a second user device, the present disclosure is also, or alternatively, applicable to the first user device transmitting a message (including content) to a plurality of user devices (e.g., transmitting a group message). In some implementations, the first user device and/or the second user device may be configured to communicate via a network connection that includes a virtual private network (VPN) connection. In some implementations, the network connection may be different than the VPN connection.

While the foregoing examples have been described with respect to filtering content transmitted by user device 105, the present disclosure is also, or alternatively, applicable to filtering content included in a message transmitted to user device 105. For example, RCS system 125 may receive the message transmitted to user device 105. RCS system 125 may obtain the subscription data of the user to determine whether the subscription data include the content filtering information.

If the subscription data does not include the content filtering information, the message may be provided to user device 105. If the subscription data includes the content filtering information and the content filtering information indicates that content filtering is not enabled, the message may be provided to user device 105. If the subscription data includes the content filtering information and the content filtering information indicates that content filtering is enabled, the content may be processed in a manner similar to the manner described above. Based on processing the content, RCS system 125 may determine whether the content is to be filtered and may perform the one or more actions in a manner similar to the manner described above.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
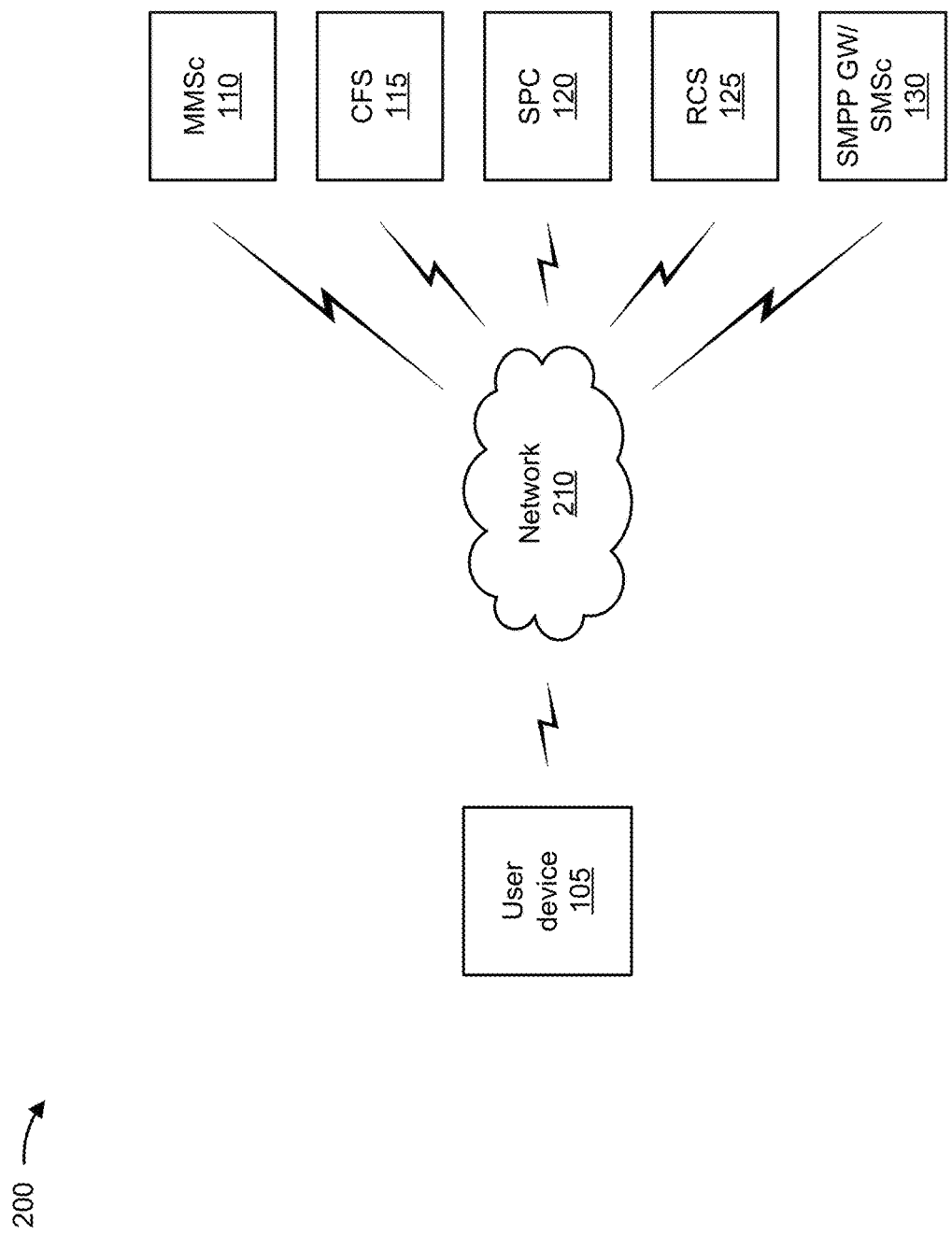
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user device 105, MMSc device 110, CFS device 115, SPC device 120, RCS system 125, SMPP GW/SMSc 130, and a network 210. Devices of environment 200 may interconnect via wired connections, wireless connections, or a combination of wired and wireless connections.

User device 105 includes one or more devices capable of receiving, generating, storing, processing, and/or providing information associated with content and/or messages, as described elsewhere herein. User device 105 may include a communication device and/or a computing device. For example, user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

MMSc device 110 includes one or more devices capable of receiving, generating, storing, processing, providing, and/or routing information, as described elsewhere herein. MMSc device 110 may include a communication device and/or a computing device. For example, MMSc device 110 may include a server, such as an application server, a client server, a web server, core network entity, radio access network entity, a database server, a host server, a proxy server, a virtual server (e.g., executing on computing hardware), or a server in a cloud computing system. In some implementations, MMSc device 110 includes computing hardware used in a cloud computing environment. MMSc device 110 may provide a legacy messaging platform utilized for picture, video, contact cards, group MMS messages, among other examples.

CFS device 115 includes one or more devices capable of receiving, generating, storing, processing, providing, and/or routing information, as described elsewhere herein. CFS device 115 may include a communication device and/or a computing device. For example, CFS device 115 may include a server, such as an application server, a client server, a web server, core network entity, radio access network entity, a database server, a host server, a proxy server, a virtual server (e.g., executing on computing hardware), or a server in a cloud computing system. In some implementations, CFS device 115 includes computing hardware used in a cloud computing environment. CFS device 115 may provide an RCS file transfer data structure where files (e.g., with or without file type restrictions) may be uploaded and downloaded for RCS.

SPC device 120 includes one or more devices capable of receiving, generating, storing, processing, providing, and/or routing information, as described elsewhere herein. SPC device 120 may include a communication device and/or a computing device. For example, SPC device 120 may include a server, such as an application server, a client server, a web server, core network entity, radio access network entity, a database server, a host server, a proxy server, a virtual server (e.g., executing on computing hardware), or a server in a cloud computing system. In some implementations, SPC device 120 includes computing hardware used in a cloud computing environment. SPC device 120 may provide a data structure where subscription data of subscribers is stored.

RCS system 125 includes one or more devices capable of receiving, generating, storing, processing, providing, and/or routing information, as described elsewhere herein. RCS system 125 may include a communication device and/or a computing device. For example, RCS system 125 may include a server, such as an application server, a client server, a web server, core network entity, radio access network entity, a database server, a host server, a proxy server, a virtual server (e.g., executing on computing hardware), or a server in a cloud computing system. In some implementations, RCS system 125 includes computing hardware used in a cloud computing environment. RCS system 125 may provide a next generation messaging platform that supports rich messaging, such as group messaging, typing indicators, read receipts, among other examples.

SMPP GW/SMSc 130 includes one or more devices capable of receiving, generating, storing, processing, providing, and/or routing information, as described elsewhere herein. SMPP GW/SMSc 130 may include a communication device and/or a computing device. For example, SMPP GW/SMSc 130 may include a server, such as an application server, a client server, a web server, core network entity, radio access network entity, a database server, a host server, a proxy server, a virtual server (e.g., executing on computing hardware), or a server in a cloud computing system. In some implementations, SMPP GW/SMSc 130 includes computing hardware used in a cloud computing environment. SMPP GW/SMSc 130 may provide a legacy messaging platform utilized for peer-to-peer messaging.

Network 210 includes one or more wired and/or wireless networks. For example, network 210 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. Network 210 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
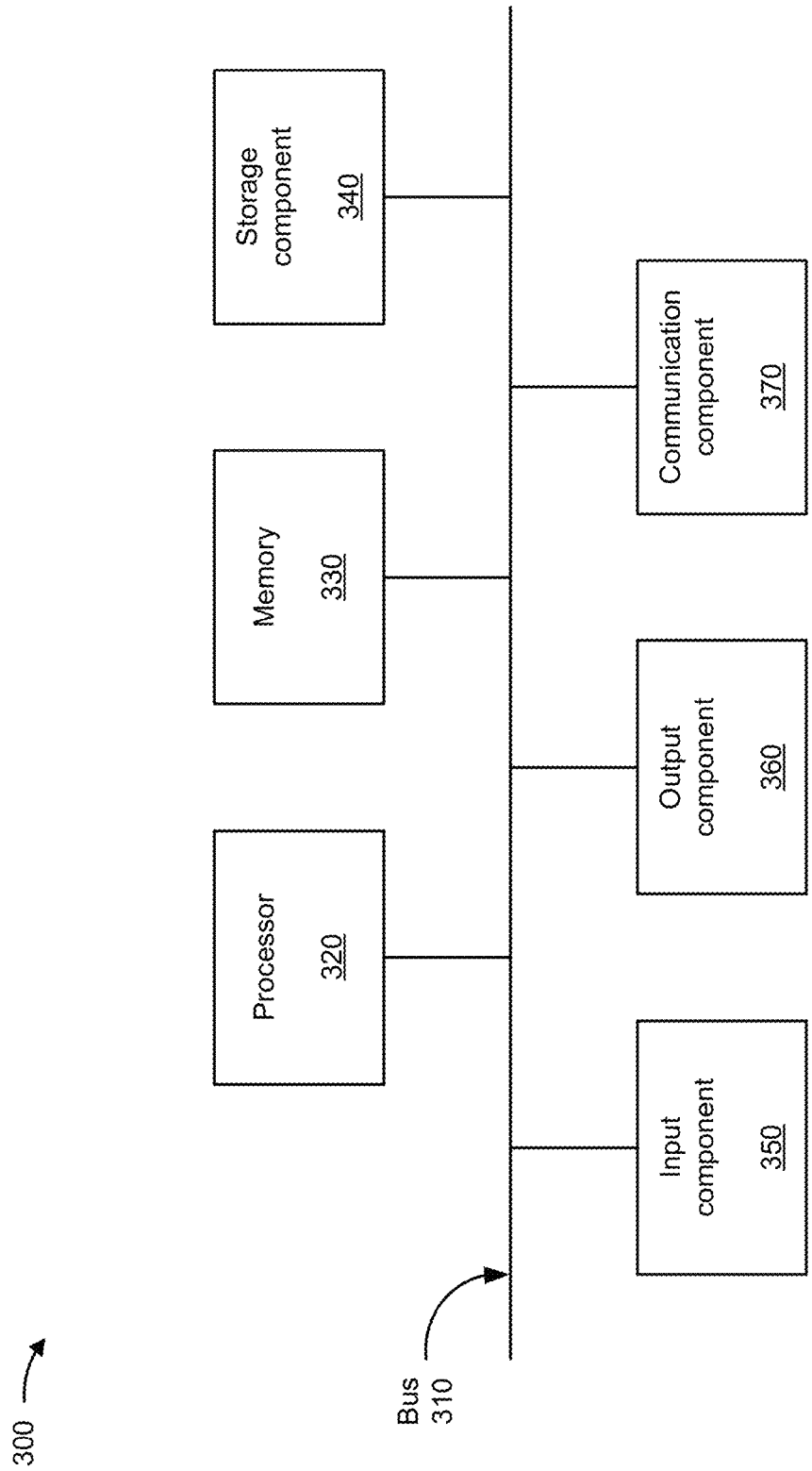
FIG. 3 is a diagram of example components of one or more devices of FIG. 2.

FIG. 3 is a diagram of example components of one or more devices of FIG. 2. The components may be components of a device 300, which may correspond to user device 105, MMSc device 110, CFS device 115, SPC device 120, RCS system 125, and/or SMPP GW/SMSc 130. In some implementations, user device 105, MMSc device 110, CFS device 115, SPC device 120, RCS system 125, and/or SMPP GW/SMSc 130 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
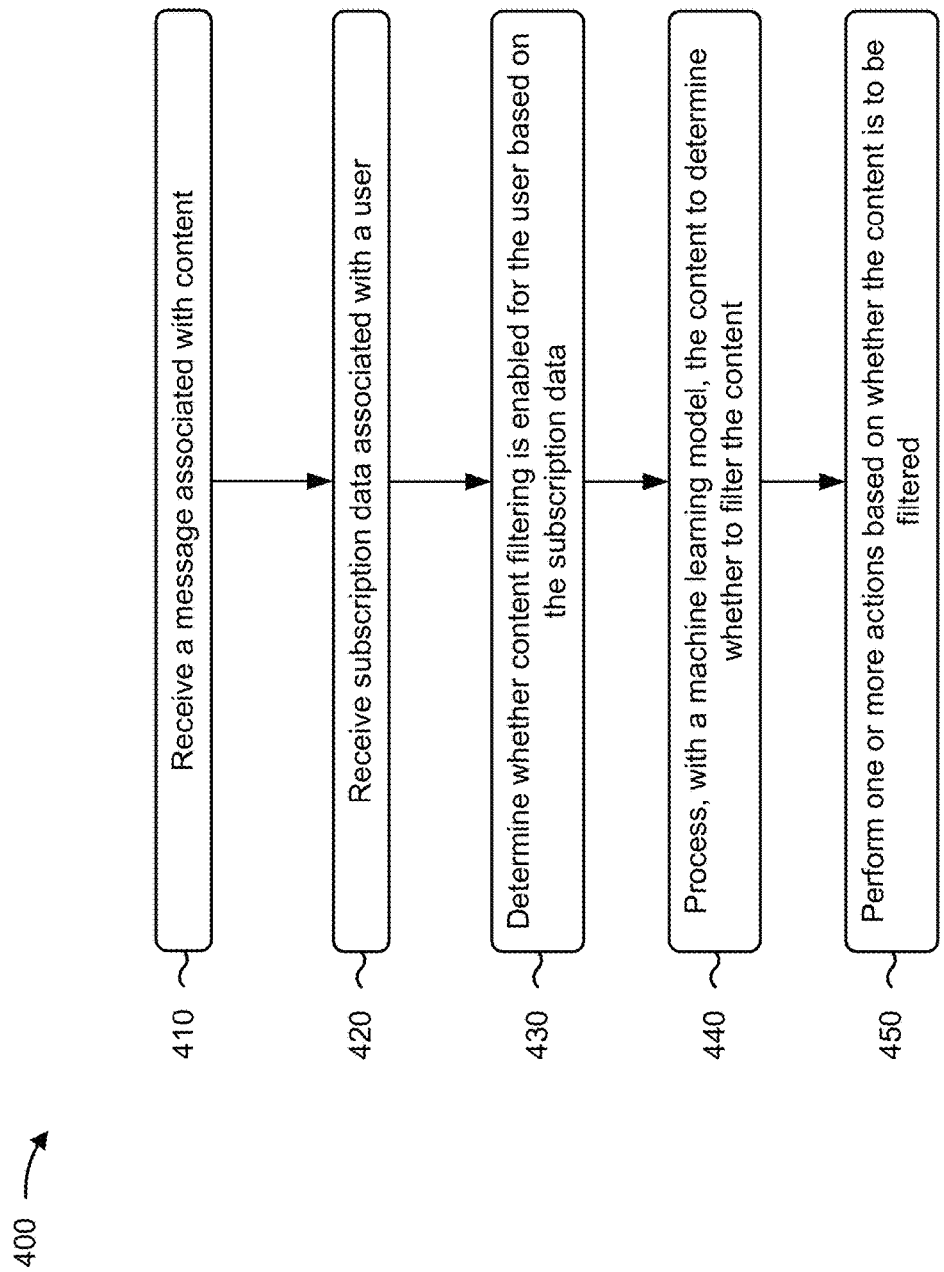
FIG. 4 is a flowchart of an example process associated with filtering content provided via messages.

FIG. 4 is a flowchart of an example process 400 associated with filtering content provided via messages. In some implementations, one or more process blocks of FIG. 4 may be performed by a device (e.g., RCS system 125). In some implementations, one or more process blocks of FIG. 4 may be performed by another device or a group of devices separate from or including the device, such a user device (e.g., user device 105), an MMSc device (e.g., MMSc device 110), a CFS device (e.g., CFS device 115), an SPC device (e.g., SPC device 120), and/or an SMPP GW/SMSc (e.g., SMPP GW/SMSc 130). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving, from a first user device, a message associated with content (block 410). For example, the device may receive a message associated with content, as described above. The message may be transmitted by a first user device and may be destined for a second user device.

In some implementations, receiving the message includes one of receiving a multimedia messaging service message redirected by a multimedia messaging service center device from the first user device to the device; or receiving a short message service message redirected by a short message service center device from the first user device to the device. In some implementations, receiving the message includes receiving the message from the first user device, and receiving a link to the content from the first user device.

As further shown in FIG. 4, process 400 may include receiving subscription data associated with a user of the first user device and including information indicating whether content filtering is enabled for the user (block 420). For example, the device may receive subscription data associated with a user of the first user device and including information indicating whether content filtering is enabled for the user, as described above.

In some implementations, receiving the subscription data associated with the user of the first user device includes providing, to a subscriber profile controller device, a request for the subscription data, and receiving the subscription data from the subscriber profile controller device based on the request.

As further shown in FIG. 4, process 400 may include determining whether content filtering is enabled for the user based on the subscription data (block 430). For example, the device may determine whether content filtering is enabled for the user based on the subscription data, as described above.

As further shown in FIG. 4, process 400 may include processing, when the content filtering is enabled for the user and with a machine learning model, the content to determine whether to filter the content (block 440). For example, the device may process, when the content filtering is enabled for the user and with a machine learning model, the content to determine whether to filter the content, as described above.

In some implementations, process 400 includes receiving an objectionable content threshold, and processing the content to determine whether to filter the content includes processing the content, with the machine learning model, to determine whether to filter the content based on the objectionable content threshold. In some implementations, the machine learning model is a classifier machine learning model.

In some implementations, processing the content to determine whether to filter the content includes determining whether the content satisfies an objectionable content threshold; and selectively determining that the content is to be filtered when the content satisfies the objectionable content threshold, or determining that the content is not to be filtered when the content fails to satisfy the objectionable content threshold.

As further shown in FIG. 4, process 400 may include performing one or more actions based on whether the content is to be filtered (block 450). For example, the device may perform one or more actions based on whether the content is to be filtered, as described above.

In some implementations, performing the one or more actions includes preventing the content from being provided to the second user device when the content is to be filtered; providing a message to a third user device, associated with a guardian of the user, when the content is to be filtered; or causing the first user device to be disabled when the content is to be filtered.

In some implementations, performing the one or more actions includes providing the content to a third user device, associated with a guardian of the user, when the content is to be filtered; or retraining the machine learning model based on whether the content is to be filtered.

In some implementations, performing the one or more actions includes preventing the content from being provided to the second user device when the content is to be filtered; receiving feedback associated with preventing the content from being provided to the second user device; and modifying the machine learning model based on the feedback.

In some implementations, process 400 includes causing the content to be transmitted to the second user device, via the message, when the content filtering is not enabled for the user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a rich communication services (RCS) system, a message associated with content, wherein the message is received from one of a multimedia messaging service center (MMSc) device, a short message peer-to-peer gateway/short message service center (SMPP GW/SMSc), or a first user device,
        wherein the message is transmitted by the first user device and is destined for a second user device, and
        wherein the message is one of a multimedia messaging service message, a short message service message, or a rich communication services message;
    receiving, by the RCS system, subscription data associated with a user of the first user device and including information indicating whether content filtering is enabled for the user,
        wherein the subscription data is received from a subscriber profiler controller (SPC) device;
    determining, by the RCS system, whether content filtering is enabled for the user based on the subscription data;
    processing, by the RCS system, when the content filtering is enabled for the user, and with a machine learning model, the content to determine whether to filter the content; and
    performing, by the RCS system, one or more actions based on whether the content is to be filtered.

2. The method of claim 1, further comprising:
    causing the content to be transmitted to the second user device, via the message, when the content filtering is not enabled for the user.

3. The method of claim 1, wherein receiving the message comprises:
    receiving a link to the content from the first user device.

4. The method of claim 1, wherein receiving the subscription data associated with the user of the first user device comprises:
    providing, to the subscriber profile controller device, a request for the subscription data; and
    receiving the subscription data from the subscriber profile controller device based on the request.

5. The method of claim 1, wherein receiving the message comprises one of:
    receiving the multimedia messaging service message redirected by the MMSc device; or
    receiving the short message service message redirected by the SMPP GW/SMSc device.

6. The method of claim 1, wherein receiving the message comprises:
    receiving, from the first user device, a link to the content in the message; and
    utilizing the link to retrieve the content.

7. The method of claim 1, wherein processing the content to determine whether to filter the content comprises:
    processing the content, with the machine learning model, to determine whether to filter the content based on a threshold.

8. A system, comprising:
    a multimedia messaging service center (MMSc) device;
    a subscriber profiler controller (SPC) device;
    a short message peer-to-peer gateway/short message service center (SMPP GW/SMSc);
    a rich communication services (RCS) system configured to:
        receive a message associated with content,
            wherein the message is received from one of the MMSc device, the SMPP GW/SMSc, or a first user device,
            wherein the message is transmitted by the first user device and is destined for a second user device, and
            wherein the message is one of a multimedia messaging service message, a short message service message, or a rich communication services message;
        receive subscription data associated with a user of the first user device and including information indicating whether content filtering is enabled for the user,
            wherein the subscription data is received from the SPC device;
        determine whether content filtering is enabled for the user based on the subscription data;
        process, when the content filtering is enabled for the user and with a machine learning model, the content to determine whether to filter the content; and
        perform one or more actions based on whether the content is to be filtered.

9. The system of claim 8, wherein the machine learning model is a classifier machine learning model.

10. The system of claim 8, wherein the RCS system is configured to:
    determine whether the content satisfies an objectionable content threshold; and
    selectively:
        determine that the content is to be filtered when the content satisfies the objectionable content threshold; or
        determine that the content is not to be filtered when the content fails to satisfy the objectionable content threshold.

11. The system of claim 8, wherein the RCS system is configured to receive an objectionable content threshold, and
    wherein, when processing the content to determine whether to filter the content, the RCS system is configured to:

process the content, with the machine learning model, to determine whether to filter the content based on the objectionable content threshold.

12. The device of claim 8, wherein the message is a first message, and
wherein, when performing the one or more actions, the RCS system is configured to one or more of:
prevent the content from being provided to the second user device when the content is to be filtered;
provide a second message to a third user device, associated with a guardian of the user, when the content is to be filtered; or
cause the first user device to be disabled when the content is to be filtered.

13. The device of claim 8, wherein, when performing the one or more actions, the RCS system is configured to one or more of:
provide the content to a third user device, associated with a guardian of the user, when the content is to be filtered; or
retrain the machine learning model based on whether the content is to be filtered.

14. The device of claim 8, wherein, when performing the one or more actions, the RCS system is configured to:
prevent the content from being provided to the second user device when the content is to be filtered;
receive feedback associated with preventing the content from being provided to the second user device; and
retrain the machine learning model based on the feedback.

15. A non-transitory computer-readable medium storing a set of instructions, the set of instructions comprising:
one or more instructions that, when executed by one or more processors of a device, cause the device to:
receive a message associated with content,
wherein the message is received from one of a multimedia messaging service center (MMSc) device, a short message peer-to-peer gateway/short message service center (SMPP GW/SMSc), or a first user device,
wherein the message is transmitted by the first user device and is destined for a second user device, and
wherein the message is one of a multimedia messaging service message, a short message service message, or a rich communication services message;
receive subscription data associated with a user of the first user device and including information indicating whether content filtering is enabled for the user,
wherein the subscription data is received from a subscriber profiler controller (SPC) device;
determine whether content filtering is enabled for the user based on the subscription data;
cause the content to be transmitted to the second user device, via the message, when the content filtering is not enabled for the user;
process, when the content filtering is enabled for the user and with a machine learning model, the content to determine whether to filter the content; and
perform one or more actions based on whether the content is to be filtered.

16. The non-transitory computer-readable medium of claim 15, wherein the one or more instructions, that cause the device to receive the message, cause the device to:
receive a link to the content via the message; and
utilize the link to retrieve the content.

17. The non-transitory computer-readable medium of claim 15, wherein the one or more instructions, that cause the device to process, when the content filtering is enabled for the user and with the machine learning model, the content to determine whether to filter the content, cause the device to:
determine whether the content satisfies an objectionable content threshold; and
selectively:
determine that the content is to be filtered when the content satisfies the objectionable content threshold; or
determine that the content is not to be filtered when the content fails to satisfy the objectionable content threshold.

18. The non-transitory computer-readable medium of claim 15, wherein the message is a first message, and
wherein the one or more instructions, that cause the device to perform the one or more actions, cause the device to one or more of:
prevent the content from being provided to the second user device when the content is to be filtered;
provide a second message to a third user device, associated with a guardian of the user, when the content is to be filtered;
cause the first user device to be disabled when the content is to be filtered;
provide the content to the third user device, associated with the guardian of the user, when the content is to be filtered; or
retrain the machine learning model based on whether the content is to be filtered.

19. The non-transitory computer-readable medium of claim 15, wherein the one or more instructions, that cause the device to perform the one or more actions, cause the device to:
prevent the content from being provided to the second user device when the content is to be filtered;
receive feedback associated with preventing the content from being provided to the second user device; and
retrain the machine learning model based on the feedback.

20. The non-transitory computer-readable medium of claim 15, wherein the one or more instructions, that cause the device to process the content to determine whether to filter the content, cause the device to:
process the content, with the machine learning model, to determine whether to filter the content based on a threshold.

* * * * *